US012697839B2

(12) United States Patent
Miles et al.

(10) Patent No.: US 12,697,839 B2
(45) Date of Patent: Aug. 4, 2026

(54) SPOKE FOR NON-PNEUMATIC TIRE HAVING EXTENDED NOSE REINFORCEMENT

(71) Applicant: COMPAGNIE GENERALE DES ETABLISSEMENTS MICHELIN, Clermont-Ferrand (FR)

(72) Inventors: Kevin C. Miles, Clemson, SC (US); Steven M. Cron, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 411 days.

(21) Appl. No.: 18/258,429

(22) PCT Filed: Dec. 22, 2020

(86) PCT No.: PCT/US2020/066544
§ 371 (c)(1),
(2) Date: Jun. 20, 2023

(87) PCT Pub. No.: WO2022/139800
PCT Pub. Date: Jun. 30, 2022

(65) Prior Publication Data
US 2024/0300264 A1 Sep. 12, 2024

(51) Int. Cl.
*B60C 7/14* (2006.01)

(52) U.S. Cl.
CPC .................................. *B60C 7/146* (2021.08)

(58) Field of Classification Search
CPC .. B60C 7/14; B60C 7/18; B60C 7/107; B60C 7/122; B60C 7/143; B60C 7/146

USPC .......................................................... 301/5.1
See application file for complete search history.

(56) References Cited

U.S. PATENT DOCUMENTS

| | | | | |
|---|---|---|---|---|
| 11,518,127 | B2 * | 12/2022 | Wilson | .................... B60C 7/143 |
| 2019/0337329 | A1 * | 11/2019 | Cron | ......................... B60C 7/18 |
| 2020/0039293 | A1 | 2/2020 | Cron et al. | |
| 2020/0331297 | A1 * | 10/2020 | Cron | ......................... B60C 7/18 |
| 2021/0086560 | A1 | 3/2021 | Miles et al. | |
| 2024/0042795 | A1 * | 2/2024 | Miles | ......................... B60B 9/26 |

FOREIGN PATENT DOCUMENTS

| | | | | |
|---|---|---|---|---|
| GB | 191516544 | A1 | 4/1916 | |
| WO | WO-2018067597 | A1 * | 4/2018 | ............... B60C 7/18 |
| WO | 2019089008 | A1 | 5/2019 | |
| WO | 2019125462 | A1 | 6/2019 | |

(Continued)

OTHER PUBLICATIONS

European Patent Office, International Search Report dated Aug. 3, 2021, pp. 1-15 (included), European Patent Office, Rijswijk, The Netherlands.

*Primary Examiner* — S. Joseph Morano
*Assistant Examiner* — Eva L Comino
(74) *Attorney, Agent, or Firm* — Neal P. Pierotti

(57) ABSTRACT

A spoke for a non-pneumatic tire is provided that has a nose that engages first and second panels that extend from the nose. An extended nose reinforcement engages the first panel, the second panel, a first foot, and a second foot. Also, the extended nose reinforcement is located between the first panel and the first foot and is located between the second panel and the second foot.

12 Claims, 6 Drawing Sheets

(56) References Cited

FOREIGN PATENT DOCUMENTS

| WO | WO-2019125467 A1 * | 6/2019 | ............. B60C 7/125 |
| WO | WO-2019133026 A1 * | 7/2019 | ............. B60C 7/146 |
| WO | WO-2020033374 A1 * | 2/2020 | ............... B60C 7/18 |
| WO | 2020131405 A1 | 6/2020 | |

* cited by examiner

SPOKE FOR NON-PNEUMATIC TIRE HAVING EXTENDED NOSE REINFORCEMENT

CROSS-REFERENCE TO RELATED APPLICATIONS

The present application is a 35 U.S.C. § 371 application of PCT/US2020/066544 filed on Dec. 22, 2020 and entitled "Spoke for Non-Pneumatic Tire Having Extended Nose Reinforcement" and claims benefit thereto. The entire contents of PCT/US2020/066544 are incorporated by reference herein in their entirety for all purposes.

FIELD OF THE INVENTION

The subject matter of the present invention relates to a spoke for a non-pneumatic tire that features an extended nose reinforcement. More particularly, the present application involves an extended nose reinforcement that extends along panels of the spoke so as to be located between these panels and the feet of the spoke.

BACKGROUND OF THE INVENTION

Non-pneumatic tires can be made of a series of spokes attached to a hub on one end and a shear band on the other. The tread of the tire is located on the outer surface of the shear band. The plurality of spokes can be V shaped with two legs, two feet, and a nose located generally in the middle. In order to strengthen the nose, it has been proposed to place stiffening layers onto the nose. The first stiffening layer has cords that are oriented 45 degrees to the radial direction of the tire. The second stiffening layer is placed onto the first stiffening layer and also includes cords that are oriented at 45 degrees to the radial direction of the tire, so that the tissue that is used is a two ply tissue with each ply having a woven fabric oriented at +/−45 degrees to the radial direction. This design is robust from a product endurance standpoint, and is capable of being manufactured without difficulty, but impacts the performance of the tire. In this regard, the pair of stiffening layers is inefficient for transferring radial loads between the two legs. The pair of layers increase the mass of the spoke in this area and in turn increase the rolling resistance of the tire. Additionally, the inclusion of cords oriented at plus and minus 45 degrees to the radial direction increases the axial stiffness of the spokes beyond a desired level.

The configuration of spokes of a non-pneumatic tire can include a nose reinforcement layer that engages both of the legs and extends only a short distance along the legs towards the nose. The nose reinforcement layer does not extend to the feet but is instead only at the nose so as not to add weight to the spokes. Although capable of adding strength to the spokes, the terminal ends create a high stress concentration at their locations that may cause cracking and limit endurance of the spoke. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
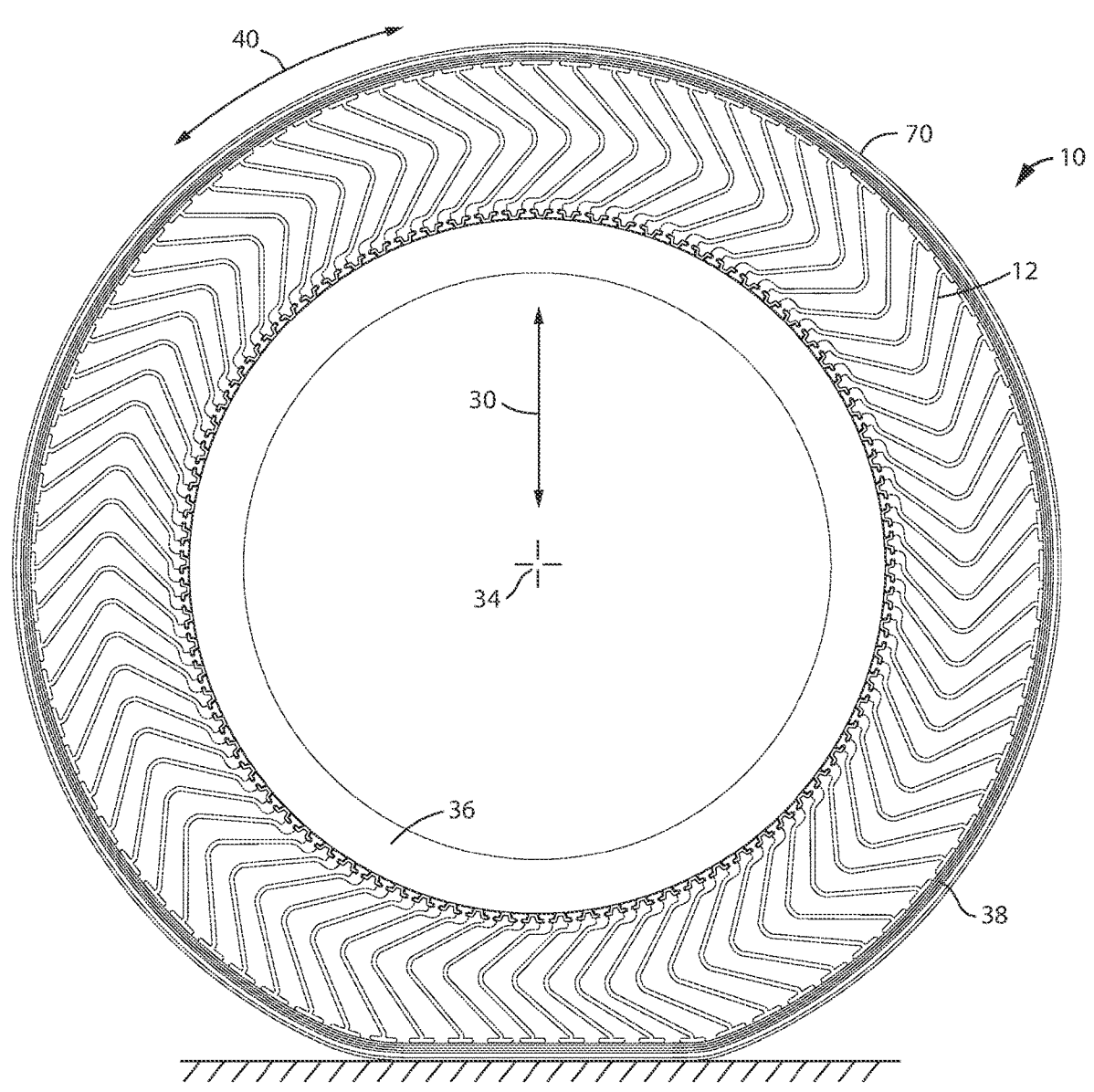
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a spoke 12 of a non-pneumatic tire 10 that includes an extended nose reinforcement 14 that is configured to avoid the introduction of a stress concentration at its radial ends. In this regard, the spoke 12 has first and second panels, that lay against a nose 28, with feet 20, 22 on their ends. The extended nose reinforcement 14 reinforces the spoke 12 at the nose 28 and extends from the first foot 20 across both panels 16, 18 to the second foot 22. The extended nose reinforcement 14 terminates at a location that is between both the first panel 16 and the first foot 20 and terminates at a location that is between both the second panel 18 and the second foot 22. These locations of the terminal ends 72, 74 are low stress areas in the operation of the spoke 12 and stress concentration cracks and failures at the terminal ends 72, 74 of the extended nose reinforcement 14 are reduced or eliminated.

FIG. 1 shows a non-pneumatic tire 10. The non-pneumatic tire 10 has an axis 34 at its center about which it rotates, and a radial direction 30 extends from the axis 34. Tread 70 is located on the outer exterior of a shear band 38 and extends all the way around the non-pneumatic tire 10 in the circumferential direction 40. The shear band 38 is located inward in the radial direction 30 from the tread 70 and likewise extends 360 degrees around the axis 34 in the circumferential direction 40. A series of spokes 12 engage the shear band 38 and extend inward in the radial direction 30 from the shear band 38 to a hub 36 of the non-pneumatic tire 10. The hub 36 features a metal cage 66 about its outer surface and the ends of the spokes 12 fit into this metal cage 66 to cause attachment of the spokes 12 to the hub 36. Any number of spokes 12 can be present, and their cross-sectional shape can be different from that shown. In some instances, between 64-80 spokes 12 are present in the non-pneumatic tire 10. The hub 36 is located inward from the spokes 12 in the radial direction 30 and can be mounted onto a wheel of the vehicle. The spokes 12 at the top of the non-pneumatic tire 10 are in tension, and the spokes 12 at the bottom are in compression as the non-pneumatic tire 10 rests on the ground and as the non-pneumatic tire 10 turns in normal operation of the vehicle.

Figure 2:
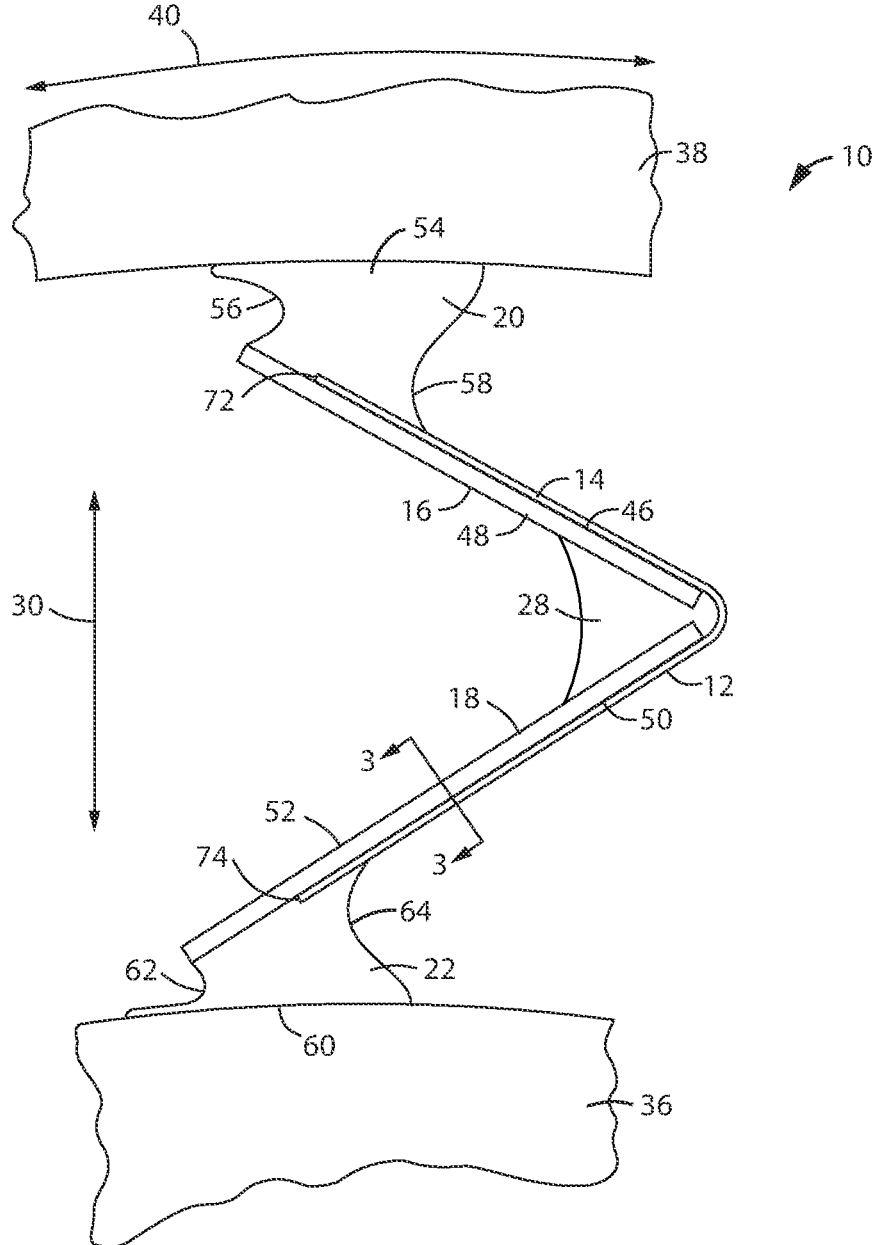
FIG. 2 is a side view of a spoke and portions of a hub and shear band of a non-pneumatic tire.

One embodiment of the spoke 12 is shown in FIG. 2 which is a side view of one of the spokes 12 and portions of the hub 36 and shear band 38. The spoke 12 is made of multiple components attached to one another, and these components can be made of rubber and other materials. The spoke 12 assumes a V-shaped configuration and extends all the way from the hub 36 to the shear band 38 in the radial direction 30. The spoke 12 includes a pair of legs, which are referred to herein as a first panel 16 and a second panel 18. The panels 16 and 18 may engage or not engage one another, and in some embodiments the panels 16 and 18 may be a single continuous piece in which different sections of this continuous piece are designated as a first panel 16 and second panel 18 or can be separate pieces as in FIG. 2. First and second feet 20, 22 are at the ends of the panels 16, 18. A nose 28 is located at the central body of the spoke 12 and has a generally triangular shaped cross-section. The spoke 12 can be assembled by taking uncured, multiple components and assembling them together and then subsequently curing them through heat and pressure so that the components are attached to one another. Each one of these components can include different materials or can have the same materials in different amounts or in the same amount. Rubber, fiberglass, urethane, polyurethane and other materials may be present in the components used to assemble the spoke 12.

The components of the spoke 12 include a first panel 16 and a second panel 18 that make up the legs of the spoke 12. The first panel 16 has the first foot 20 located on one end that engages the first panel 16 and extends farther in the radial direction 30 than the terminal end of the first panel 16. The second panel 18 has a second foot 22 on one end that engages the second panel 18 and extends farther inward in the radial direction 30 than the terminal end of the second panel 18. The nose 28 is present on one side of the spoke 12 in the circumferential direction 40 and engages the first and second panels 16, 18. To reinforce the spoke 12 at its center section, an extended nose reinforcement 14 is provided and engages both the first and second panels 16, 18. The extended nose reinforcement 14 is on opposite sides of the panels 16, 18 in the circumferential direction 40 from the nose 28. The extended nose reinforcement 14 engages the body 28 as well as the panels 16, 18, but in other embodiments the extended nose reinforcement 14 does not engage (contact) the body 28. It is to be understood that the shape and size of the spoke 12 can be varied in accordance with different exemplary embodiments, and that a variety of spoke 12 configurations are possible.

The extended nose reinforcement 14 is a single, continuous piece that extends all the way from the first foot 20 to the second foot 22. A terminal end 72 is located at the outer end of the extended nose reinforcement 14 in the radial direction 30, and a terminal end 74 is located at the inner end in the radial direction 30. The terminal end 72 is located between the first foot 20 and the first panel 16 so that it goes under the first foot 20 upon extension from the center of the spoke 12. The extended nose reinforcement 14 does not go all the way to the radial end of the first panel 16, but instead stops short of the radial end of the first panel 16 so that the first foot 20 does engage the first panel 16. The positioning of the terminal end 72 may be such that a longer length of the first foot 20 engages the first panel 16 as compared to the length of engagement of the first foot 20 with the extended nose reinforcement 14. The area of the terminal end 72 in the spoke 12 is an area of low stress in the spoke 12 during operation. As such, cracks and other failures of the spoke 12 at the terminal end 72 of the extended nose reinforcement 14 will be reduced or minimized because the terminal end 72 is no longer located at a high stress position in the spoke 12. The arrangement of the terminal ends 72, 74 under the feet 20, 22 increases the endurance of the design. The placement of the terminal ends 72, 74 under the feet 20, 22 locates them in a low stress zone, as compared to being located on the panels 16, 18 but not in engagement with the feet 20, 22 closer to the nose 28.

The terminal end 74 is located between the second foot 22 and the second panel 18 so that it goes under the second foot 22 upon extension from the center of the spoke 12. The extended nose reinforcement 14 does not go all the way to the radial end of the second panel 18 which is closest to the hub 36, but instead stops short of the radial end of the second panel 18 so that the second foot 22 does engage the second panel 18. The positioning of the terminal end 74 may be such that a longer length of the second foot 22 engages the second panel 18 as compared to the length of engagement of the second foot 22 with the extended nose reinforcement 14. The area of the terminal end 74 in the spoke 12 is an area of low stress in the spoke 12 during operation. As such, cracks and other failures of the spoke 12 at the terminal end 74 of the extended nose reinforcement 14 will be reduced or minimized because the terminal end 74 is no longer located at a high stress position in the spoke 12.

The first foot 20 can be variously shaped in accordance with different exemplary embodiments. In the embodiment presented in FIG. 2, the first foot 20 has a first foot glue surface 54 that engages the inner radial surface of the shear band 38 and may be attached thereto though the use of adhesive. A first foot first concave surface 56 is present on a circumferential end of the first foot 20 and may be defined at least partially by a lip that likewise defines a portion of the first foot glue surface 54. The first foot first concave surface 56 may extend all the way to the first panel 16 or could stop short of the surface of the first foot 20 that engages the first panel 16. The first foot 20 also has a first foot second concave surface 58 located on an opposite end of the first foot 20 in the circumferential direction 40 from the first foot first concave surface 56. The first foot second concave surface 58 may extend all the way to the extended nose reinforcement 14 or could stop short of the surface of the first foot 20 that engages the extended nose reinforcement 14. The radius of curvature of the first foot second concave surface 58 can be different than the radius of curvature of the first foot first concave surface 56. The first foot second concave surface 58 may extend all the way to the shear band 38 or may stop short of the shear band 38 as shown in FIG. 2. The two concave surfaces 56, 58 may extend different lengths in the radial direction 30 such that the first foot first concave surface 56 extends a shorter length in the radial direction 30 than does the first foot second concave surface 58.

The second foot 22 can be arranged in the same manner as the first foot 20 or can be arranged in a different shape in other embodiments. In the FIG. 2 embodiment, the second foot 22 is shaped generally in the same manner as the first foot 20. The second foot 22 has a second foot glue surface 60 that is concave in shape, as opposed to the convex shaped first foot glue surface 54, that engages the convex shaped outer radial end of the hub 36. Adhesives can be used to attach the second foot glue surface 60 to the hub 36. A second foot first concave surface 62 is present on a circumferential end of the second foot 22 and may be defined at least partially by a lip that likewise defines a portion of the second foot glue surface 60. The second foot first concave surface 62 may extend all the way to the second panel 18 or could stop short of the surface of the second foot 22 that engages the second panel 18. The second foot 22 also has a second foot second concave surface 64 located on an opposite end of the second foot 22 in the circumferential direction 40 from the second foot first concave surface 62. The second foot second concave surface 64 may extend all the way to the extended nose reinforcement 14 or could stop short of the surface of the second foot 22 that engages the extended nose reinforcement 14. The radius of curvature of the second foot second concave surface 64 can be different than the radius of curvature of the second foot first concave surface 62. The second foot second concave surface 64 may extend all the way to the hub 36 or may stop short of the hub 36 as shown in FIG. 2. The two concave surfaces 62, 64 may extend different lengths in the radial direction 30 such that the second foot first concave surface 62 extends a shorter length in the radial direction 30 than does the second foot second concave surface 64.

The spoke 12 will become deformed during normal operation of the tire 10 but can maintain a generally V shape at all points in operation. In this regard, the panels 16, 18 are arranged in a generally V shape with the feet 20, 22 at either ends. The first panel 16 has a first panel first surface 46 and an oppositely disposed first panel second surface 48. The first panel first surface 46 engages the extended nose reinforcement 14 and the first foot 20 and is free from contact with the nose 28, and the first panel second surface 48 engages the nose 28 and is free from contact with the first foot 20 and the extended nose reinforcement 14. The second panel 18 has a second panel first surface 50 and an oppositely disposed second panel second surface 52. The second panel first surface 50 engages the extended nose reinforcement 14 and the second foot 22 and does not engage the nose 28, and the second panel second surface 52 is free from engagement with the extended nose reinforcement 14 and the second foot 22 but does engage the nose 28. The first panel second surface 48 faces the second panel second surface 52 in the V shaped configuration, and the first panel first surface 46 and the second panel first surface 50 face away from one another in the V shaped configuration. As shown the extended nose reinforcement 14 engages the entire first panel first surface 46 and second panel first surface 50 except for the portions of these surfaces 46, 50 that engage the feet 20 and 22.

Figure 3:
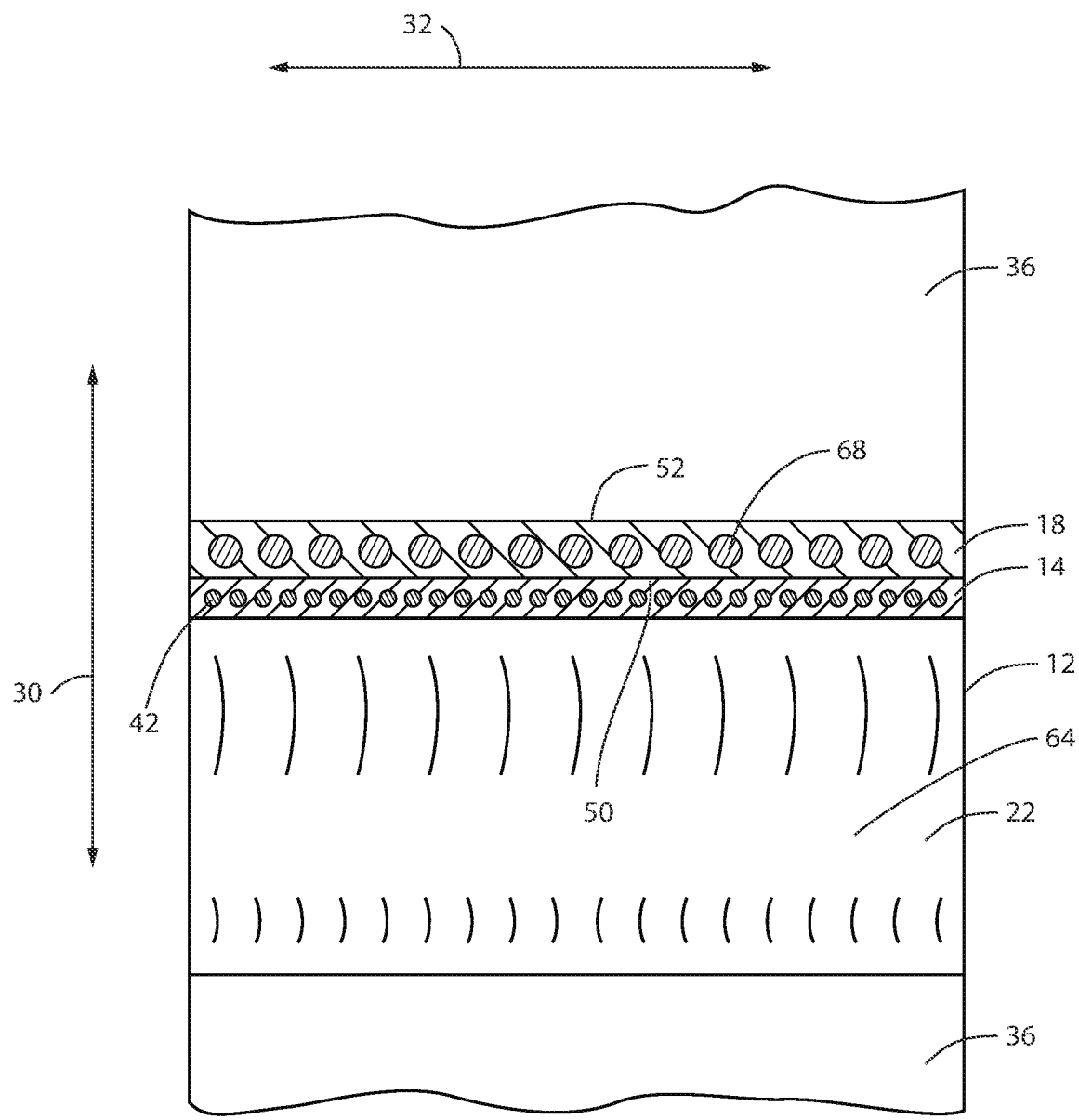
FIG. 3 is a cross-sectional view taken along line 3-3 of FIG. 2.

FIG. 3 is a cross-sectional view taken along line 3-3 of FIG. 2 that shows the extended nose reinforcement 14 including a plurality of cords 42 that are parallel to one another. The cords 42 may engage one another or can be spaced from one another. The cords 42 may be embedded within rubber of the extended nose reinforcement 14, that makes up the rest of the extended nose reinforcement 14, so that none of the cords 42 are present on the exterior surface of the extended nose reinforcement 14. The rubber of the extended nose reinforcement 14 may make up all of the exterior surfaces of the extended nose reinforcement 14. The cords 42 can be made of nylon or polyester. The cords 42 function to strengthen the extended nose reinforcement 14 and may be present in any number in other embodiments and may be absent in yet other embodiments of the spoke 12. The panel 18 likewise has cords 68 that are parallel to one another and spaced from and out of engagement with one another. The cords 68 can also be made of nylon, polyester, or fiberglass (CVR) and may be embedded in rubber making up the rest of the second panel 18 so that none of the cords 68 form any part of the exterior surfaces of the second panel 18. The cords 68 function to increase the strength of the second panel 18 but need not be present in other embodiments. Although not shown, the first panel 16 can likewise have parallel cords within it for added strength.

The spoke 12 has an axial direction 32 that is perpendicular to the radial direction 30. The components of the spoke 12 such as the first foot 20, second foot 22, first panel 16, second panel 18, nose 28, and extended nose reinforcement 14 may extend along the entire axial length of the spoke 12 in the axial direction 32. In this regard, the extended nose reinforcement 14 has the same length in the axial direction 32 as does the feet 20, 22 and the panels 16, 18 so that large attachment surfaces are present between the extended nose reinforcement 14 and these components.

Figure 4:
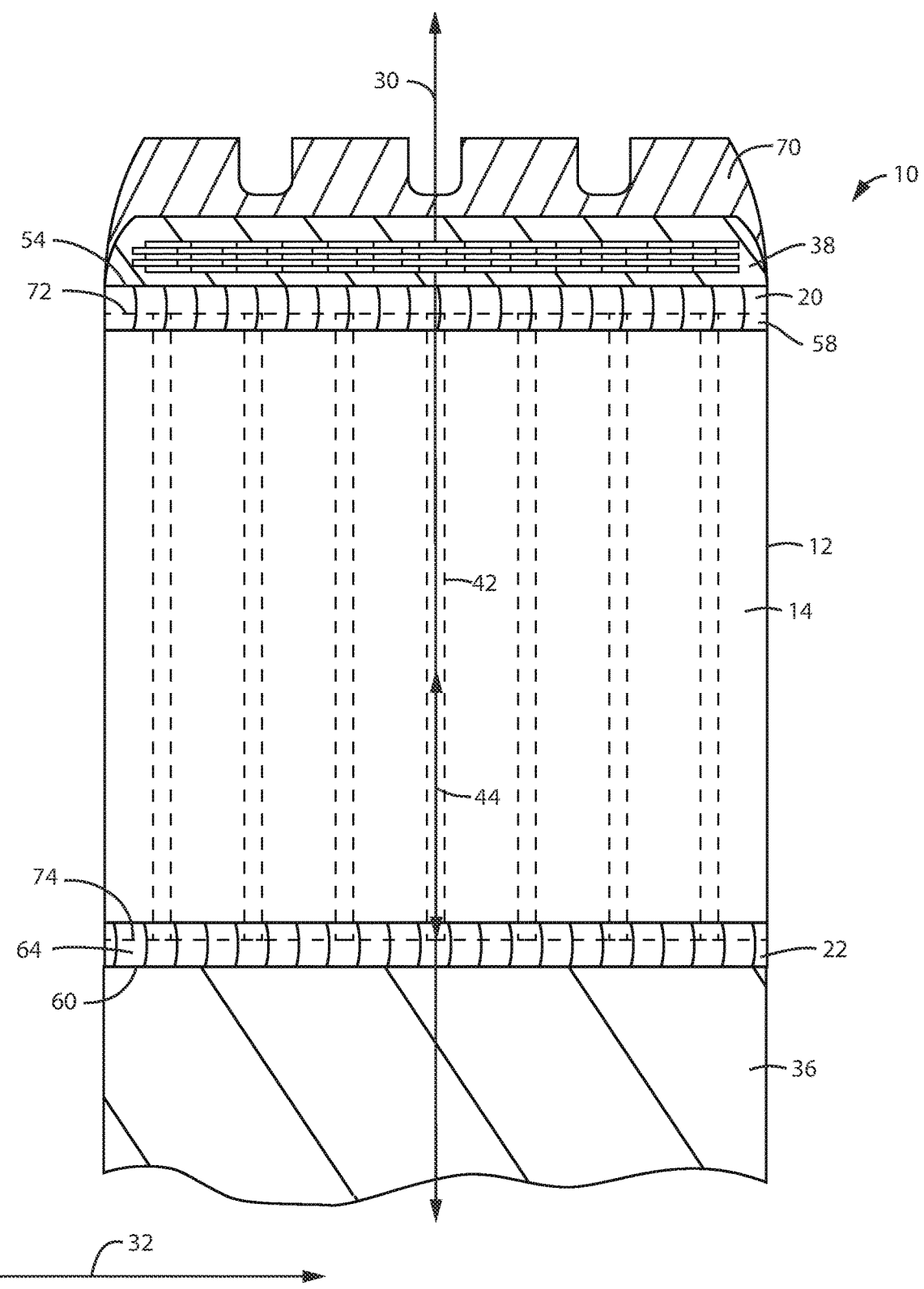
FIG. 4 is a front view of the spoke of FIG. 2 which also shows a cross-sectional view through the tread and shear band, and a portion of the hub.

FIG. 4 is a front view of the spoke 12 and a cross-sectional view of the hub 36, shear band 38 and tread 70. The shear band 38 has multiple reinforcement elements that extend in the circumferential direction 40 and that are embedded within rubber of the shear band 38. The tread 70 rests on the outer radial surface of the shear band 38. The extended nose reinforcement 14 and the feet 20, 22 of the spoke 12 are the only components of the spoke 12 that can be seen in the FIG. 4 view. The cords 42 extend in the extended nose reinforcement 14 from the second foot 22 to the first foot 20. This extension is in the radial direction 30, and also in the circumferential direction 40, but is not in the axial direction 32. With respect to the radial direction 30, the cords 42 are parallel to a radial-circumferential plane so that the angle 44 between the direction of cord 42 extension and the radial-circumferential plane is zero. The cords 42 can all be parallel to one another so that they all have an angle 44 that is zero.

The arrangement of cords 42 that have an angle 44 that is zero degrees, hence parallel to the radial direction 30, does not adversely impact the lateral stiffness of the spoke 12 beyond a desirable level. This is because the stiffness of the cords 42 will be directed in the radial direction 30 and not in the axial direction 32 because there is no component of extension of the cords 42 in the axial direction 32. The spoke 12 can be arranged so that only a single extended nose reinforcement 14 is present, and not two or more nose reinforcements. The use of but a single extended nose reinforcement 14 will decrease mass of the spokes 12 and will improve rolling resistance performance.

Figure 5:
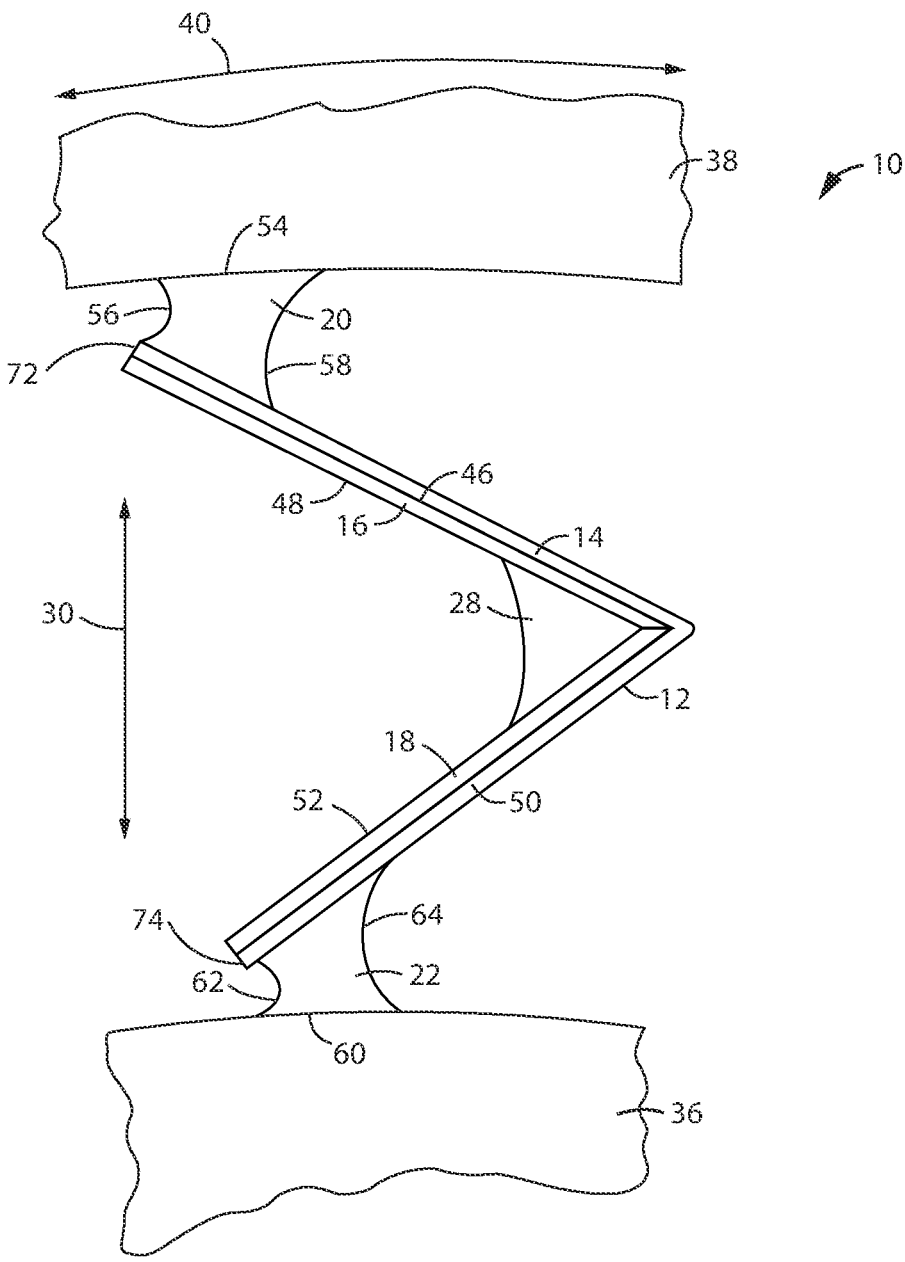
FIG. 5 is a side view of a spoke and portions of a hub and shear band of a non-pneumatic tire in accordance with another embodiment.

FIG. 5 is an alternative exemplary embodiment of the spoke 12 that includes all of the components of the FIG. 2 embodiment but are arranged in somewhat different manners. The first foot first and second concave surfaces 56, 58 both extend all the way from the extended nose reinforcement 14 to the first foot glue surface 54. Likewise, the second foot first and second concave surfaces 62, 64 extend all the way from the extended nose reinforcement 14 to the second foot glue surface 60. The feet 20, 22 do not have the lips associated with the glue surfaces 54, 60. Also, the first and second panels 16, 18 engage one another, and the nose 28 is free from engagement with the extended nose reinforcement 14. The extended nose reinforcement 14 extends all the way to the end of the first and second panels 16, 18 so that the terminal ends 72 and 74 are both visible and not hidden from view by the feet 20, 22. The extended nose reinforcement 14 extends along the entire lengths of the panels 16, 18 so that the entire first panel first surface 46 and the entire second panel first surface 50 are engaged by the extended nose reinforcement 14. The extended nose reinforcement 14 extends along and engages the feet 20, 22 so that the foot 20 does not engage either of the panels 16 or 18, and so that the foot 22 does not engage panel 16 or panel 18. In this embodiment, the component of the spoke 12 that the feet 20, 22 engage is the extended nose reinforcement 14. In other embodiments, the extended nose reinforcement 14 can wrap around the ends of the first and second panels 16, 18 so that the terminal ends 72, 74 are located at the inside facing faces of the panels 16, 18. The extended nose reinforcement 14 if wrapping around the ends of the first and second panels 16, 18 can stop short of contacting the nose 28 or the terminal ends 72, 74 could in fact engage the nose 28.

Figure 6:
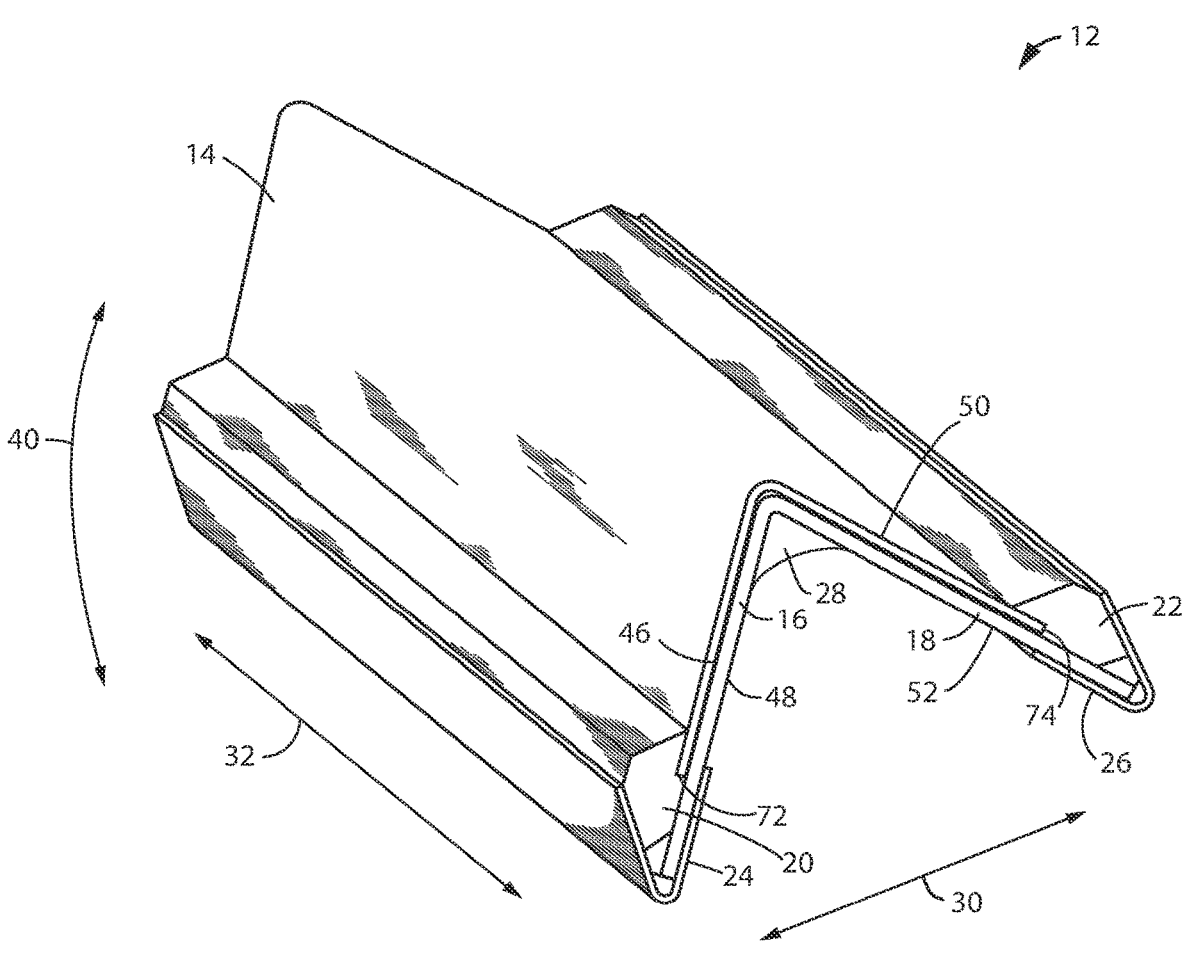
FIG. 6 is a perspective view of a spoke of a non-pneumatic tire in accordance with yet another embodiment.

A still further arrangement of the spoke 12 is illustrated in FIG. 6 in perspective view. The extended nose reinforcement 14 engages the panels 16 and 18, along with the feet 20 and 22, but does not engage the nose 28. The panels 16 and 18 are shown as being a single, continuous panel in which the first and second panels 16, 18 are defined so as to be parts of this single, continuous panel. As such, it is to be understood that the panels 16 and 18 may be separate components in some embodiments and may be parts or areas of a single component in yet other embodiments. The extended nose reinforcement 14 as shown has terminal ends 72, 74 that engage the feet 20, 22 so that the feet 20, 22 are able to engage the panels 16 and 18. The terminal ends 72, 74 are arranged so that a longer engagement is between the panels 16, 18 and the feet 20, 22 as compared to the engagement between the extended nose reinforcement 14 and the feet 20, 22.

The spoke 12 in FIG. 6 includes two additional components which are the first foot layer 24 and the second foot layer 26. The layers 24, 26 can be made of rubber and may have the same material compositions as other components of the spoke 12 or may have a unique mixture of materials from the rest of the spoke 12. The first foot layer 24 engages the first panel second surface 48 and wraps around the end of the first panel 16 and a portion of the first foot 20 and engages the first foot 20. The first foot layer 24 does not wrap around the entire first foot 20, but only a portion thereof. The first foot layer 24 functions to increase the strength of the spoke 12 at its end, and the first foot layer 24 may engage the shear band 38 and be attached thereto, while none or in some instances some of the first foot 20 may also engage and be attached to the shear band 38 along with the first foot layer 24. A second foot layer 26 engages the second panel second surface 52 and wraps around and engages the second foot 22 but does not wrap completely around the second foot 22 so that some of the second foot 22 is left exposed. The second foot layer 26 increases the strength of the end of the spoke 12 and can engage the outer radial surface of the hub 36 and be attached thereto. In this instance, some or none of the second foot 22 will also be attached to the hub 36.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A spoke for a non-pneumatic tire, comprising:
   a nose;
   a first panel that engages the nose and that extends from the nose;
   a second panel that engages the nose and that extends from the nose, wherein the first panel and the second panel are separate pieces;
   a first foot;
   a second foot; and
   an extended nose reinforcement that is a single, continuous piece that engages the first panel, the second panel, the first foot, and the second foot, wherein the extended nose reinforcement is located between the first panel and the first foot, wherein the extended nose reinforcement is located between the second panel and the second foot;
   wherein the extended nose reinforcement has a plurality of cords that are oriented at zero degrees to a radial-circumferential plane.

2. The spoke as set forth in claim 1, wherein the plurality of cords are made of nylon.

3. The spoke as set forth in claim 1, wherein the plurality of cords are made of polyester.

4. The spoke as set forth in claim 1, further comprising:
   a first foot layer that engages the first panel and the first foot; and
   a second foot layer that engages the second panel and the second foot.

5. The spoke as set forth in claim 1, wherein the first panel has a first panel first surface and a first panel second surface, wherein the second panel has a second panel first surface and a second panel second surface, wherein the first panel and the second panel are oriented into a V shape, wherein the first panel first surface and the second panel first surface are oriented so as to face away from one another, wherein the first panel second surface and the second panel second surface are oriented so as to face towards one another, and wherein the extended nose reinforcement engages the first panel first surface and the second panel first surface.

6. The spoke as set forth in claim 5, wherein the nose engages the first panel second surface and the second panel second surface.

7. The spoke as set forth in claim 1, wherein the first foot has a first foot glue surface, a first foot first concave surface, and a first foot second concave surface, wherein the first foot second concave surface terminates at the extended nose reinforcement;
   wherein the second foot has a second foot glue surface, a second foot first concave surface, and a second foot second concave surface, wherein the second foot second concave surface terminates at the extended nose reinforcement.

8. The spoke as set forth in claim 7, wherein the first foot first concave surface terminates at the extended nose reinforcement, wherein the second foot first concave surface terminates at the extended nose reinforcement.

9. A spoke for a non-pneumatic tire, comprising:
   a nose;
   a first panel that engages the nose and that extends from the nose;
   a second panel that engages the nose and that extends from the nose, wherein the first panel and the second panel are separate pieces;
   a first foot;
   a second foot; and
   an extended nose reinforcement that is a single, continuous piece that engages the first panel, the second panel, the first foot, and the second foot, wherein the extended nose reinforcement is located between the first panel and the first foot, wherein the extended nose reinforcement is located between the second panel and the second foot;
   wherein the first foot does not engage the first panel and does not engage the second panel, and wherein the second foot does not engage the first panel and does not engage the second panel.

10. A spoke for a non-pneumatic tire, comprising:

a nose;

a first panel that engages the nose and that extends from the nose;

a second panel that engages the nose and that extends from the nose, wherein the first panel and the second panel are separate pieces;

a first foot;

a second foot; and an extended nose reinforcement that is a single, continuous piece that engages the first panel, the second panel, the first foot, and the second foot, wherein the extended nose reinforcement is located between the first panel and the first foot, wherein the extended nose reinforcement is located between the second panel and the second foot;

wherein the first foot engages the first panel and does not engage the second panel, and wherein the second foot engages the second panel and does not engage the first panel.

11. The spoke as set forth in claim 1, wherein the extended nose reinforcement is a continuous piece that extends uninterrupted from the first foot to the second foot.

12. The spoke as set forth in claim 1, wherein the extended nose reinforcement engages the nose.

\* \* \* \* \*